Feb. 19, 1952      E. WILHABER      2,586,451
CUTTER FOR GEARS, FACE COUPLINGS, AND THE LIKE
Filed Sept. 17, 1947      2 SHEETS—SHEET 1
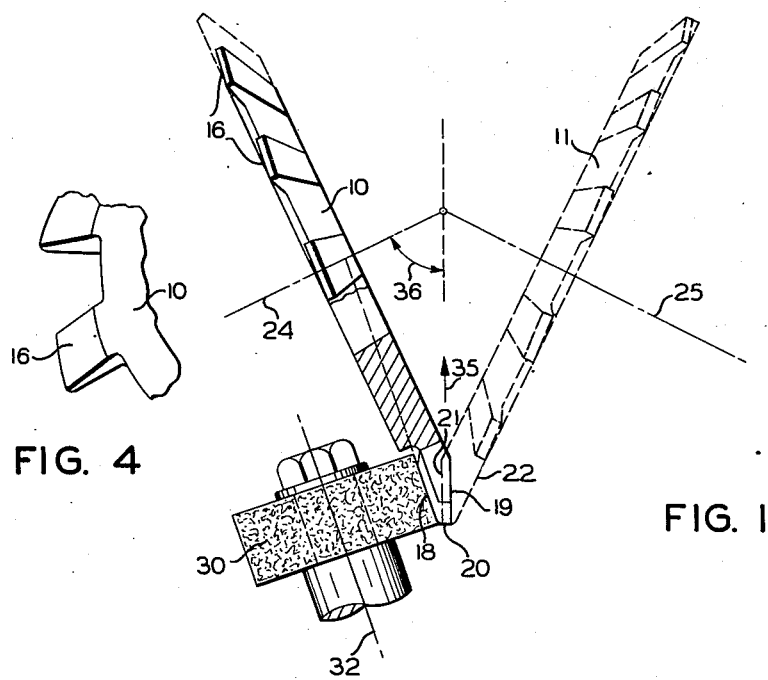
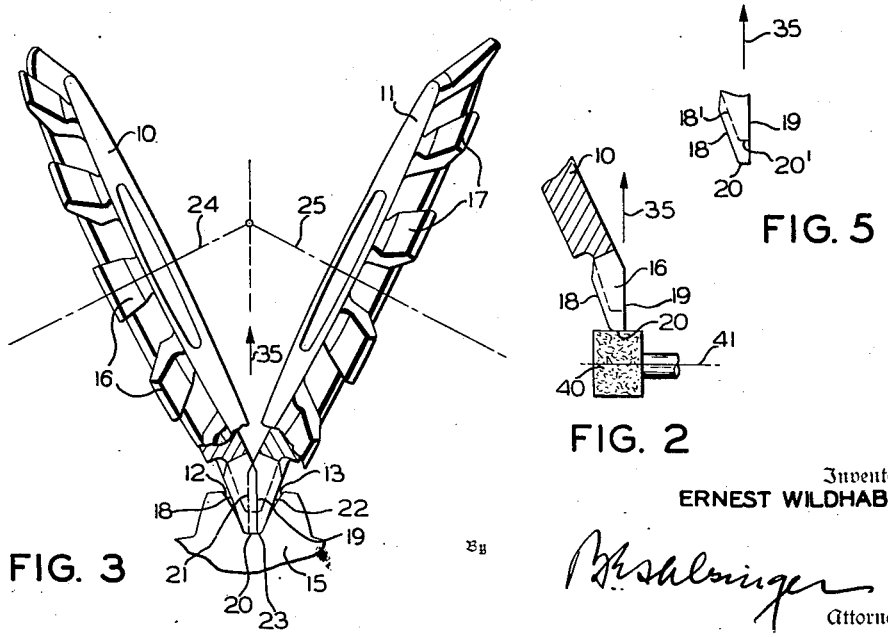
Inventor
ERNEST WILDHABER
Attorney Feb. 19, 1952     E. WILHABER     2,586,451
CUTTER FOR GEARS, FACE COUPLINGS, AND THE LIKE
Filed Sept. 17, 1947     2 SHEETS—SHEET 2

Inventor
ERNEST WILDHABER

By
*Attorney*

Patented Feb. 19, 1952

2,586,451

UNITED STATES PATENT OFFICE 2,586,451

CUTTER FOR GEARS, FACE COUPLINGS, AND THE LIKE

Ernest Wilhaber, Brighton, N. Y., assignor to Gleason Works, Rochester, N. Y., a corporation of New York Application September 17, 1947, Serial No. 774,464

3 Claims. (Cl. 29—104)

The present invention relates to disc-type milling cutters such as are used in cutting straight toothed gears, face clutch members, etc. and to the relieving of such cutters. More specifically, the invention relates to disc milling cutters of the type which have a plane or an internal conical cutting surface at one side, and to the relieving of such cutters.

Straight toothed bevel and spur gears, straight toothed face clutch or coupling members, and the like, may be cut with a disc milling cutter by rotating the cutter in engagement with the work while holding the cutter in a relatively fixed position longitudinally of the work. Usually the cutter employed has straight-profiled side-cutting edges at one side which lie either in a plane perpendicular to the axis of the cutter or in an internal conical surface which is coaxial with the cutter axis. The cutter is positioned so that these side-cutting edges are inclined to the pitch surface of the work in accordance with the pressure angle of the tooth surfaces to be cut on the work. The cutter may have side-cutting edges at one side only or it may have side-cutting edges at both sides. Symmetrical tooth surfaces can be cut on the work, however, only by using two cutters which are positioned as described, or by using one cutter to cut one side of the teeth of the work and then repositioning the cutter and cutting the opposite side of the teeth. The tooth surfaces may be form-cut by simply feeding the rotating cutter or cutters depthwise into the work, or they may be generated by rolling the rotating cutter or cutters with the work as though the work were meshing with a gear represented by the cutter or cutters. If two cutters are used they may be positioned so that they cut in the same tooth space or they may be positioned to cut in separate tooth spaces simultaneously. In the former case, the two cutters are so located and rotated that their blades interlock or intermesh as they pass through a tooth space of the blank. The cutters may be made with cutting teeth arranged all around their peripheries or the cutting teeth may be arranged part-way only around the periphery of a cutter and there may be a gap between the last and first blades of the cutter to permit indexing of the work, while this gap is abreast of the work, without withdrawing the cutter from engagement with the work.

One object of the present invention is to provide a cutter of the character described each of whose blades is so relieved as to have a constant shape throughout its useful life.

Another object of the invention is to provide a method for relieving disc cutters so as to produce such a constant shape on the blades.

A still further object of the invention is to provide a cutter of the character described which requires only a simple adjustment after sharpening, and will then cut the same shape as when new.

Other objects of the invention will be apparent hereinafter from the specification and from the recital of the appended claims.

In the drawings:

Fig. 1 is a view illustrating relieving of one side of the blades of a disc cutter according to one embodiment of the present invention and showing diagrammatically the relationship between this cutter and a cooperating cutter when the two cutters are in cutting position;

Fig. 2 is a fragmentary view showing one blade of one cutter in section and illustrating how the tip surface of the blade is relieved according to the present invention;

Fig. 3 is an elevational view, with parts broken away, showing the pair of cutters in operative position for generation of a tooth space of a bevel gear;

Fig. 4 is a fragmentary side elevational view of one cutter;

Fig. 5 is a view of one of the blades of the cutter illustrating diagrammatically how its shape is maintained throughout its life as a result of relieving according to the present invention;

Figure 6:
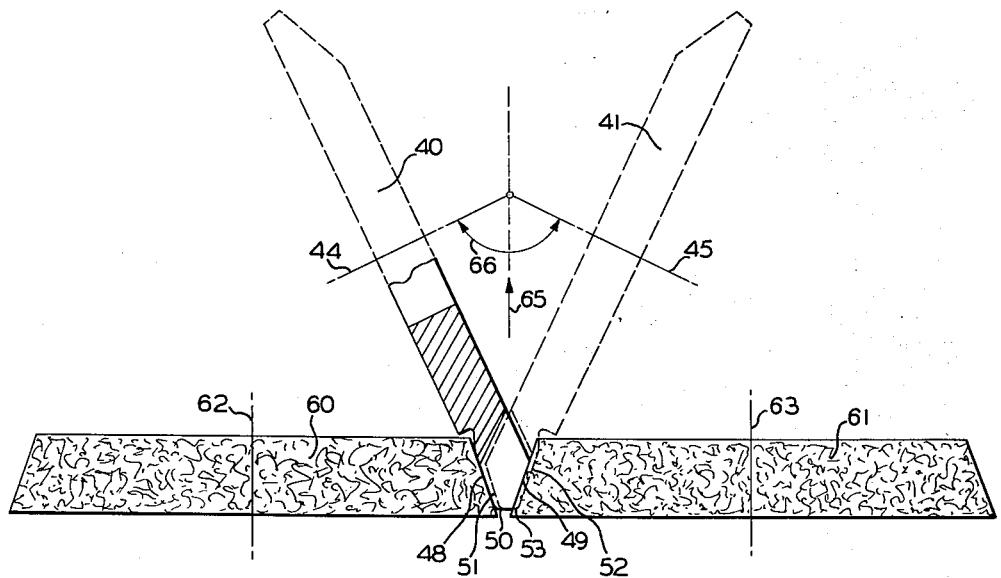
Figure 7:
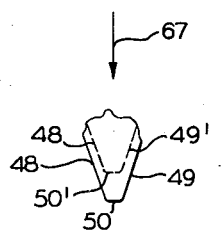

Fig. 6 is a view, similar to Fig. 1, illustrating how opposite sides of the cutting blades of a somewhat modified form of disc cutter are relieved simultaneously according to the present invention, and showing also the relationship between this cutter and a cooperating cutter when the two cutters are in cutting position; and Fig. 7 is a view similar to Fig. 5, showing a blade of the cutter of Fig. 6 and illustrating how its shape is maintained throughout its life.

Referring now to the drawings by numerals of reference, 10 and 11 designate a pair of disc-milling cutters such as may be employed in finish-cutting opposite sides 12 and 13 of a tooth space of a bevel gear 15. The cutters have a plurality of cutting teeth or blades 16 and 17, respectively, arranged around their peripheries. Each cutting blade 16 of the cutter 10 has opposite side profiles 18 and 19 and a tip edge 20. Each cutting blade of cutter 11 has opposite side profiles 21 and 22 and a tip edge 23.

Each of the cutters has side-cutting edges at one side only, for the two cutters are adapted to cut, as a pair, opposite side tooth surfaces, respectively, of a work-piece. The profiles 18 and 22 of the cutters are the profiles of the side-cutting surfaces of the cutters. These profiles are the actual cutting edges of the blades of the cutters if the cutters are sharpened so that their cutting edges lie in axial planes of the cutters. The cutting blades are sharpened in known manner by grinding back the front faces of the blades. The sides of the cutters containing profiles 19 and 21 are non-cutting for the side profiles 22 and 18 project laterally beyond the profiles 19 and 21, respectively.

In the embodiment shown, the side-cutting profiles 18 and 22 are straight. They may lie in planes perpendicular, respectively, to the axes 24 and 25, respectively, of the two cutters, or they may lie, as shown, in slightly internal conical surfaces coaxial with the axes 24 and 25. In the latter case, the cutters will cut longitudinally crowned tooth surfaces on the work. The side profiles 19 and 21 of the two cutters lie in external conical surfaces coaxial, respectively, with the axes 24 and 25 of the cutter.

In use, the two cutters are positioned as shown in Fig. 3 with their axes 24 and 25 inclined to the pitch surface of the work so that their cutting edges 18 and 22 will cut tooth surfaces of the required pressure angle on the work. This means that the axes 24 and 25 are inclined to one another at the supplement of the included angle between the opposite sides of a tooth space of the work. In the embodiment shown, the tip-cutting edges 20 and 23 are inclined to the axes 24 and 25, respectively, of the two cutters at the pressure angles of the tooth surfaces. This is for the purpose of producing smooth bottoms in the tooth spaces of the work.

Where a bevel gear or face clutch member having longitudinally converging tooth surfaces is to be cut, the cutters are positioned not only with their axes inclined to the pitch surface of the work but also, as shown, so that they will cut tooth surfaces, as required, which converge from the outer to the inner ends of the teeth. In the cutting operation, the cutters are rotated on their respective axes 24 and 25. If the tooth surfaces are to be generated, the cutters and blank are also rolled relative to one another according to known practice.

Since the sides of the blades, which contain profiles 19 and 21 are non-cutting, they can be ground as true conical surfaces and without relief. The other sides and tips of the blades, however, have to be relieved back of their side and tip cutting edges to achieve proper cutting action.

The purpose of the present invention is to provide cutters which will require a minimum of adjustment after sharpening and which will have the same effective cutting profile throughout their lives. Fig. 1 illustrates how the cutting sides of the blades 16 of the cutter 10 may be relieved to achieve these ends. Here a cylindrical grinding wheel 30 is employed. This wheel is positioned relative to the cutter to be relieved with its axis 32 inclined to the axis 24 of the cutter at an angle determined by the angle of the internal conical cutting surface to be ground on the cutter. In the relieving operation, the cutter 10 is rotated continuously on its axis 24 and the grinding wheel 30 is rotated continuously on its axis 32 while a relative reciprocatory movement is imparted between the cutter and grinding wheel which is at the rate of once per blade of the cutter as the cutter rotates under the wheel. The reciprocatory motion may be imparted to the wheel or to the work and is in a direction such as indicated by arrow 35, inclined to the cutter axis 24 at an angle 36 equal to half the included angle between the axes 24 and 25 of the cutters when the cutters are in engagement with the work. It is also inclined to cutting profile 18 at the pressure angle of the tooth surface which is to be cut by cutting profile 18. It is perpendicular to the tip cutting edges 20. If the reciprocatory motion is imparted to the wheel it is in the direction 35 as a blade passes under the grinding wheel and in the opposite direction as the wheel is being returned to initial position ready to grind the next blade.

For relieving the tips of the blades a cylindrical grinding wheel 40 (Fig. 2) may be used whose axis 41 is inclined to the axis 24 of the wheel at the complement of angle 36. Again the relief movement is in a direction 35 perpendicular to the tips of the blades and inclined to the cutter axis at half the included angle between the axes of the two cutters when in operative engagement with the work. During relieving of the tips of the blades, the cutter is again rotated on its axis continuously and the grinding wheel is rotated continuously on its axis 24 while a relative reciprocatory movement is produced between the wheel and the work in the direction 35 at the rate of once per blade of the cutter per revolution of the cutter, withdrawal occurring in the gaps between successive blades of the cutter for the purpose of returning the wheel to starting position ready to grind the next blade.

The effect of relieving a tool in the manner described is shown in Fig. 5. The full lines 18, 19, and 20 denote the sides and tip of a blade of cutter 10, when the cutter is new. After the blade has been sharpened, the profiles of the relieved surfaces are further back on those surfaces and side profile 19 is shortened accordingly, so that the sharpened blade may have side 18', tip 20' and now-shortened side 19. It will be noted that the blade has the same point-width and that its sides have the same inclination to one another as when the cutter was new. Hence, after sharpening, it is not necessary to advance the cutter axially or tilt it to bring the cutter into correct position for cutting. All that is required is to adjust the cutter in the direction opposite to direction 35. This simplifies the construction of the gear-cutting machine and simplifies adjustment of the cutter and work.

The cutter 11 is relief-ground in the same way as the cutter 10, the grinding wheels being simply positioned in engagement with a side edge 22 and a tip edge 23 and moved in a direction 35 inclined at half the included angle between the axes 24 and 25 of the two cutters.

The present invention may be applied not only to the relieving of finishing cutters but also to the relieving of roughing cutters and to the relieving of cutters which are intended to both rough-cut and finish-cut. Such cutters may have side-cutting edges on both sides as well as on their tips. The relieving of such cutters by the method of the present invention is shown in Figs. 6 and 7.

Fig. 6 shows a pair of interlocking disc cutters of the type disclosed in the application of Leonard O. Carlsen, Serial No. 765,291, filed Aug. 1, 1947, and now Patent No. 2,567,273, granted Sept. 11, 1951. The two cutters are denoted at 40 and 41, respectively, and their axes at 44 and 45, respectively. The cutter 40 has side-cutting profiles 48 and 49 at opposite sides, and the cutter 41 has side-cutting profiles 51 and 52 at opposite sides. The cutters may be sharpened so that alternate blades have opposite side-cutting edges, or each blade may be sharpened to have side-cutting edges at both sides. The cutting surfaces, whose profiles are denoted at 49 and 51, the external conical surfaces coaxial with the axes 44 and 45, respectively, of the cutters. The cutting surfaces, whose profiles are designated 48 and 52 may be plane surfaces perpendicular to axes 44 and 45, respectively, or internal conical surfaces coaxial with these surfaces, respectively. The profiles of the tip surfaces of the two cutters are denoted at 50 and 53, respectively. The tip edges again are inclined to the axes of the cutters and lie in conical surfaces coaxial of said axes.

For relieving the sides of the blades of cutter 40, two conical grinding wheels 60 and 61 may be employed. These two wheels are rotated on their respective axes 62 and 63 while the cutter is rotated on its axis 44 and while relative reciprocatory movements are effected between cutter and wheels in a direction 65 which is contained in a plane that bisects the angle 66 at which the two cutter axes 44 and 45 are disposed when in cutting position. The direction 65 is also inclined to either side cutting surface at the pressure angle of the tool. It is perpendicular to the tip profile 50 and more inclined to the cutter axis 44 than side profile 49 and less inclined to the cutter axis than side profile 48. The reciprocatory movement is again at the rate of once per blade per revolution of the cutter, the quick return movement taking place between engagement of the wheels with successive blades of the cutter.

The tip surfaces of the blades of the cutter may be relieved in a manner such as illustrated in Fig. 2, the grinding wheel being moved relative to the work in the direction 65 and being quickly returned in the opposite direction between grinding of the tips of successive blades.

The side and tip surfaces of cutter 41 are relieved in similar manner to those of cutter 40, the grinding wheels being simply positioned to engage the side and tip surfaces of the blades of cutter 41 and the same motions being employed as in the relieving of the blades of cutter 40.

Fig. 7 shows a relieved blade of cutter 40. The full lines 48, 49 and 50 show the blade when new. The dotted lines 48', 49' and 50' denote profiles back of the cutting face of the blade when new, and they denote, also, the positions of the cutting edges after sharpening.

It will be noted that the blade has a constant profile shape throughout its life, and that it will cut the same shape after sharpening as when new, provided that it is advanced after sharpening in a direction 67 opposite to direction 65 of relief of the surfaces of the blade.

The invention is applicable to cutters having cutting blades all around their periphery as well as to cutters of the gap type such as disclosed in the Carlsen application Serial No. 707,079, filed November 1, 1946. It may be used also in the relieving of non-interlocking disc-milling cutters, and in the relieving of disc-milling cutters having curved profile blades.

While the invention has been described in connection with certain particular embodiments thereof, it will be understood that it is capable of further modification, and that this application is intended to cover any variations, uses, or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. A set of disc milling cutters for cutting gears, face clutch members and the like, said set comprising two intermeshing rotary disc milling cutters, which are of opposite hand, respectively, and which operate with their axes inclined to one another and intersecting, and which cut, respectively, opposite sides of a tooth space of the work, each of said cutters having a plurality of cutting blades arranged around its periphery, each of said blades having a front face, opposite side surfaces and a tip surface, each of said blades having a side-cutting edge formed at the juncture of its front face and one of its side surfaces and having a tip-cutting edge formed at the juncture of its front face and its tip surface, the tip surface and said one side surface of each blade being relieved back of the front face of each blade to provide cutting clearance for said side-cutting edge and said tip-cutting edge, respectively, of the blade, and the tip surface and said one side surface of each blade intersecting in a line which is parallel to a plane of symmetry containing the bisector of the angle between the axes of the two cutters whereby, after the two cutters have been sharpened, they may be adjusted together in the direction of said bisector, to adjust the sharpened cutters to take the same cut as taken originally.

2. A set of disc milling cutters for cutting gears, face clutch members and the like, said set comprising two intermeshing rotary disc milling cutters, which are of opposite hand, respectively, and which operate with their axes inclined to one another and intersecting, and which cut, respectively, opposite sides of a tooth space of the work, each of said cutters having a plurality of cutting blades arranged around its periphery, each of said blades having a front face, opposite side surfaces and a tip surface, each of said blades having side edges formed at the junctures of its front face and its two opposite side surfaces and having a tip cutting edge formed at the juncture of its front face and its tip surface, the tip surface and both side surfaces of each blade being relieved back of the front face of each blade, and the tip surface of each blade intersecting the two side surfaces of each blade in lines which are parallel to a plane of symmetry containing the bisector of the angle between the axes of the two cutters, whereby, after the two cutters have been sharpened, they may be adjusted together in the direction of said bisector to adjust the sharpened cutters to take the same cut as taken originally.

3. A set of disc milling cutters for cutting gears, face clutch members and the like, said set comprising two intermeshing rotary disc milling cutters which are of opposite hand, respectively, and which operate with their axes inclined to one another and intersecting, and which cut, respectively, opposite sides of a tooth space of the work, each of said cutters having a plurality of cutting blades arranged around its periphery, each of said blades having a front face, opposite side surfaces and a tip surface, each of said blades having side edges at opposite sides formed at the junctures of its front face and its opposite side surfaces and having a tip cutting edge formed at the juncture of its front face and its tip surface, the side edges at one side of the blades of each cutter lying in an external conical surface coaxial with the cutter and the opposite side edges of the blades of each cutter lying in an internal conical surface coaxial with the cutter, each of said blades being relieved back of its front face on its tip surface and on both its side surfaces, and the tip surface of each blade intersecting the two side surfaces of each blade in lines which are parallel to a plane of symmetry containing the bisector of the angle between the axes of the two cutters, whereby, after the two cutters have been sharpened, they may be adjusted together in the direction of said bisector to adjust the sharpened cutters to take the same cut as taken originally.

ERNEST WILHABER.

REFERENCES CITED

The following references are of record in the file of this patent:

UNITED STATES PATENTS

| Number | Name | Date |
|---|---|---|
| 56,058 | Jennings | July 3, 1866 |
| 247,204 | Loveren | Sept. 20, 1881 |
| 795,021 | Beale | July 18, 1905 |
| 1,370,573 | Wingqvist | Mar. 8, 1921 |
| 1,376,972 | Runde | May 3, 1921 |
| 1,474,500 | Wingqvist | Nov. 20, 1923 |
| 2,187,550 | Tow | Jan. 16, 1940 |
| 2,210,273 | Wildhaber | Aug. 6, 1940 |
| 2,238,064 | Kraus | Apr. 15, 1941 |
| 2,267,182 | Wildhaber | Dec. 23, 1941 |
| 2,398,763 | Bagne | Apr. 23, 1946 |
| 2,407,502 | Kraus | Sept. 10, 1946 |
| 2,456,842 | Rutbel | Dec. 21, 1948 |

FOREIGN PATENTS

| Number | Country | Date |
|---|---|---|
| 535,236 | Germany | Oct. 9, 1931 |